United States Patent [19]

Schmidt

[11] Patent Number: 4,919,161
[45] Date of Patent: Apr. 24, 1990

[54] APPARATUS FOR REMOVING RESIDUES FROM PARTS OF PLASTICS PROCESSING MACHINES

[75] Inventor: Rudolf Schmidt, Munich, Fed. Rep. of Germany

[73] Assignee: C. CHRIST Abgasfreie Werkzeugreinigungsapparate für die Kunststoffindustrie, Munich, Fed. Rep. of Germany

[21] Appl. No.: 354,454

[22] Filed: May 19, 1989

[30] Foreign Application Priority Data

May 27, 1988 [DE] Fed. Rep. of Germany ....... 3818144

[51] Int. Cl.$^5$ ................................................. B08B 3/08
[52] U.S. Cl. ..................................... 134/108; 134/105; 134/188; 134/192; 134/195
[58] Field of Search ..................... 134/5, 104.2, 104.4, 134/105, 107, 108, 188, 192, 195

[56] References Cited

U.S. PATENT DOCUMENTS

| | | | |
|---|---|---|---|
| 2,151,354 | 3/1939 | Osuch | 134/105 X |
| 3,319,638 | 5/1967 | Ellison | 134/108 X |
| 3,613,699 | 10/1971 | Holm | 134/105 X |
| 4,375,819 | 3/1983 | Kyatt | 134/105 |
| 4,474,199 | 10/1984 | Blaudszun | 134/105 |
| 4,611,614 | 9/1986 | Schmidt | 134/107 |
| 4,823,819 | 4/1989 | Schmidt | 134/105 X |

Primary Examiner—Philip R. Coe
Attorney, Agent, or Firm—Henry M. Feiereisen

[57] ABSTRACT

An apparatus for removing plastic residues from parts of plastics processing machines includes a vessel which is closed in air tight manner by a lid and contains a liquid heat transfer fluid which is heated by heating elements to a temperature above the melting point of the plastic material adhering to the parts. For shortening the working cycle for heating and cooling the heat transfer fluid and also for shortening the cleaning process per se, the interior of the vessel cooperates with a pump which circulates the heat transfer fluid. In order to prevent a decomposition of the heat transfer fluid, inert gas is introduced into the space above the liquid level of the heat transfer fluid for displacing the prevailing air volume.

11 Claims, 1 Drawing Sheet

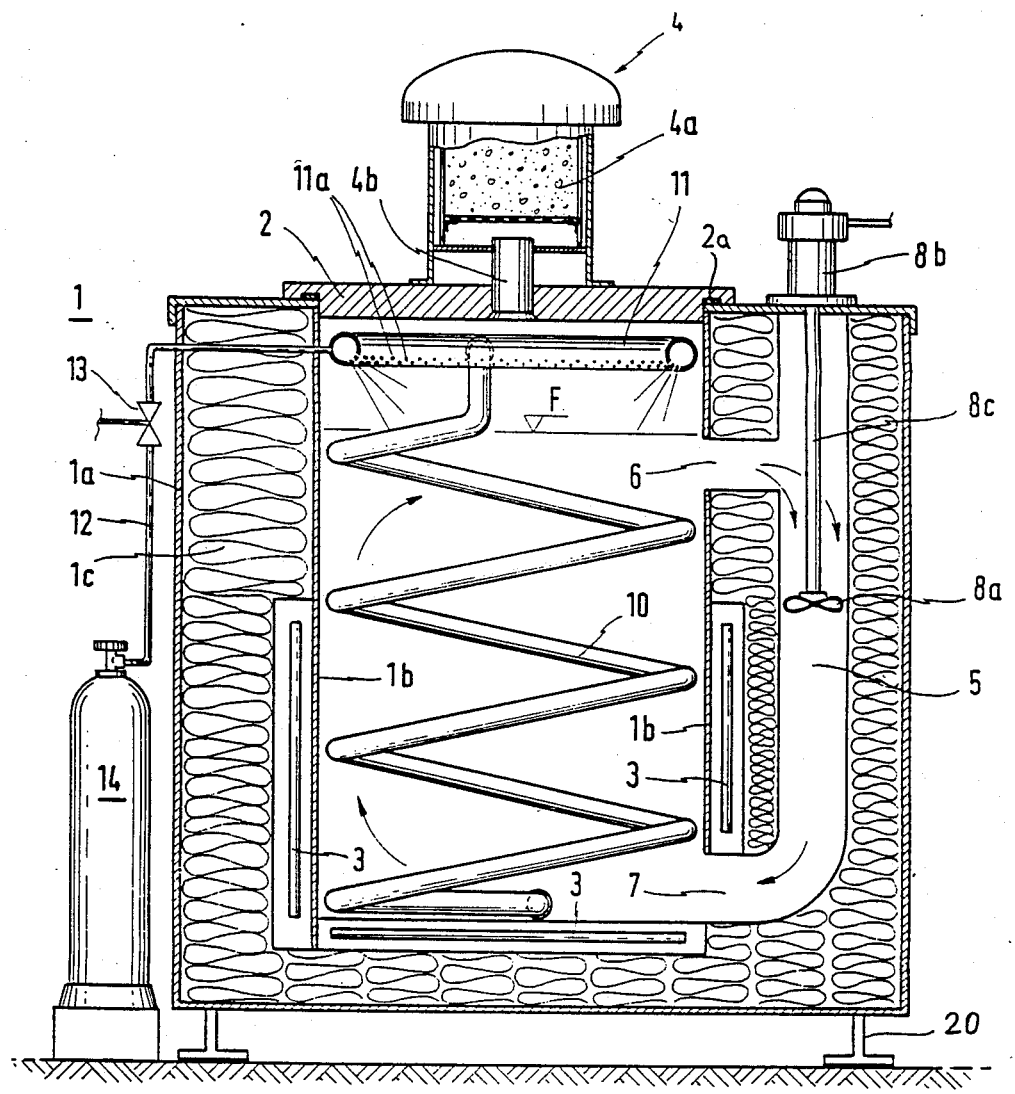

1

APPARATUS FOR REMOVING RESIDUES FROM PARTS OF PLASTICS PROCESSING MACHINES

BACKGROUND OF THE INVENTION

The present invention is related to an apparatus for removing residues, in particular plastic residues, from parts of plastics processing machines.

German patent No. DE-PS 37 12 640 discloses an apparatus for removing plastic residues from parts of plastics processing machines which includes a vessel closed in air tight manner by a lid and containing a heat transfer fluid which is heatable to a temperature above the melting point of the plastic material adhering to the parts. Immersing within the heat transfer fluid is a disk operatively connected to a compressed-air vibrator so as to oscillate the heat transfer fluid for supporting the cleaning action. Placed on the lid is a tubular casing box which accommodates the vibrator. A pipe connects the interior of the vessel with the casing box via an activated charcoal filter so that vapor and gases may escape therethrough and are suitably filtered before being released to the atmosphere. The vessel is further connected via an overflow with a collecting receptacle.

Although plastic material adhering to the parts will usually not be decomposed so that the formation of toxic or other obnoxious gases is prevented which otherwise would require a stationary installment of the cleaning apparatus and its equipment with a suitable exhaust system, such a cleaning apparatus has the drawback that the heating and the cooling of the heat transfer fluid especially when vessels of large volume are concerned takes usually a long time. To shorten the heating time by increasing the heating capacity is possible only to a very limited degree because that could easily lead to local overheating and ensuing decomposition of the heat transfer fluid. A further drawback of this known cleaning apparatus resides in the fact that at temperatures of up to 400° C., the air volume prevailing above the liquid level decomposes part of the heat transfer fluid and frequently also the removed plastic material through oxidation. Such decomposition is even more prevalent with increased duration of the heating stage as well as of the actual cleaning stage and of the cooling stage.

The German publication No. DE-GM 78 20 264 describes a container for cleaning metal parts by means of a cleaning liquid. The container accommodates an impeller pump within a tubular pump compartment which is defined by an axis extending parallel to the center axis of the treatment chamber and is connected with the treatment chamber via an upper channel and a lower channel. The impeller pump and additional deflectors cause the cleaning liquid to flow at a very high flow rate of up to 40 m/s in order to improve the cleaning by flowing around the metal parts.

SUMMARY OF THE INVENTION

It is thus an object of the present invention to provide an improved cleaning apparatus for removing residues from parts of plastics processing machines obviating the afore-stated drawbacks.

More particularly, is an object of the present invention to provide an improved cleaning apparatus for removing residues from parts of plastics processing machines by which the heating period, the cleaning period and the cooling period can be shortened.

These objects and others which will become apparent hereinafter are attained in accordance with the present invention by providing a pump for imparting a motion to the heat transfer fluid, with the pump having a suction side connected to the interior of the vessel in vicinity of the liquid level of the heat transfer fluid and a delivery side connected to the interior in vicinity of the lower end of the vessel and by introducing an inert gas into the interior of the vessel above the liquid level of the heat transfer fluid.

Through the provision of a pump arrangement, the working cycle of the cleaning apparatus can be curtailed because the heating time and the cooling time for the heat transfer fluid as well as the cleaning time is shortened. Moreover, apart from shortening the duration of the overall cleaning cycle, also a decomposition of the heat transfer fluid and of the removed plastic residues is prevented in combination with the introduction of inert gas by which the atmospheric oxygen is displaced. Thus, the service life of the heat transfer fluid is considerably extended and the formation of obnoxious decomposition products is avoided.

In contrast hereto, German publication DE-GM No. 78 20 264 is primarily concerned with improving the cleaning effect and does neither relate to the problem of decomposition nor to the ensuing objects of the present invention. On the other hand, the circulation of the heat transfer fluid as proposed by the present invention—when taken by itself—does not contribute to the cleaning result as cleaning of the parts is not attained by mechanical or physico-chemical means i.e. by dissolving the plastic residues in the heat transfer fluid; rather, the cleaning effect is based on solely the physical process of liquefaction of the plastic residues, with the circulation of the heat transfer fluid preventing local overheating. Thus, the cleaning apparatus can be operated at higher heating capacity and at higher cleaning temperature to thereby reduce the heat-up period as well as the cleaning period and the cooling period.

According to a further feature of the present invention, a circular conduit is arranged above the liquid level of the heat transfer fluid within the interior of the vessel and includes a plurality of bores which are directed into the interior of the vessel to allow inert gas supplied by a respective source and connected to the circular conduit to be introduced into the interior of the vessel for removing air which prevails above the liquid level. Suitably, the bores extend slantingly in direction toward the center axis of the vessel.

According to yet another feature of the present invention, the vessel is provided with a tubular pump compartment which accommodates the pump and defines an axis extending parallel to the center axis of the vessel. The pump compartment is connected with the interior via an upper channel which represents the suction side of the pump and a lower channel which represents the delivery side of the pump. Preferably, the pump includes an impeller which is located in the pump compartment and forces heat transfer fluid through the upper channel and pumps it through the lower channel to attain a circulation of the heat transfer fluid. The impeller is suitably connected via a shaft to a pump motor which may be arranged outside the vessel. Thus, it is not required to encase the pump motor nor is it is necessary to design the pump motor in heat-resistant manner.

In order to avoid unnecessary heat losses, the tubular pump compartment is surrounded by a heat insulation.

BRIEF DESCRIPTION OF THE DRAWING

The above and other objects, features and advantages of the present invention will now be described in more detail with reference to the accompanying drawing in which:

The sole FIGURE is a schematically simplified longitudinal section of one embodiment of a cleaning apparatus in accordance with the present invention.

DETAILED DESCRIPTION OF A PREFERRED EMBODIMENT

Referring now to the nonlimiting example as illustrated in the drawing, there is shown a longitudinal section of one embodiment of a cleaning apparatus for removing residues of plastic material from parts of plastics processing machines. The cleaning apparatus includes a double-walled vessel 1 which stands on a surface by means of a suitable support 20. The vessel 1 is provided with an external wall 1a and an internal wall 1c between which a heat insulation 1c is disposed. Introduced through the upper open end of the vessel 1 are the parts of a plastics processing machine which are coated with adhering plastic residues, such as extruder screws, extruder heads or the like. The upper open end of the vessel 1 is closable by an end plate or lid 2 in airtight manner via suitable seals 2a.

The vessel 1 contains a liquid heat transfer fluid which can be heated to a preselected temperature of up to about 400° C. by a suitable electric heating unit such as heating elements 3 which are arranged in vicinity of and parallel to the internal wall 1b and the bottom area of the vessel 1. For ease of illustration, the connecting cables of the heating elements 3 are not shown.

The interior of the vessel 1 is filled with a liquid heat transfer fluid so as to define a liquid level as indicated by designation F. The temperature of the heat transfer fluid should not essentially exceed the melting temperature of the plastic residues adhering to the parts so as to avoid a decomposition which could result in undesired gaseous products. After being removed from the parts, the plastic residues float upwards and accumulate on the surface of the heat transfer fluid.

At a suitable location, the vessel 1 is provided with an overflow or drain pipe which restricts the liquid level F of the heat transfer fluid within the vessel 1 and is suitably connected to a collecting receptacle for accumulating drained fluid from the vessel 1. Since being no part of the present invention, the overflow pipe and the collecting receptacle are not shown. Preferably, the parts to be cleaned are charged into the vessel 1 by means of a basket-like insert which for ease of illustration is also not shown.

Placed at a central location on the lid 4 is a tubular casing box 4 which is equipped with a filter such as an activated charcoal filter 4a and is connected to the within the interior of the vessel 1 at a distance to the pipe socket 4b and above the liquid level F of the heat transfer fluid is a circular conduit 11 which is connected via a conduit 12 and a valve 13 with a tank 14 containing an inert gas such as nitrogen. The circular conduit 11 is provided with a plurality of bores 11a which preferably are directed slantingly to the center axis of the vessel 1 to allow introduction of nitrogen into the interior of the vessel 1 at a desired angle.

After charging the vessel 1 with the parts to be cleaned, the lid 2 is closed and the valve 13 is momentarily opened, preferably automatically via a not shown run-off control. Nitrogen flows from the nitrogen tank 14 through the bores 11a of the circular conduit 11 into the interior of the vessel 1 to displace the air prevailing above the liquid level F. By angling the bores 11a in the described manner, the air suitably escapes through the pipe socket 4b via the activated charcoal filter 4a into the casing box 4 which is arranged on top of the lid 2.

At the same time or subsequently, the temperature of the heat transfer fluid is raised by the heating elements 3 to the predetermined value which as previously mentioned should not essentially exceed the melting temperature of the plastic material adhering to the parts to be cleaned for avoiding decomposition and the formation of gaseous products. The removed plastic material usually floats upwards and accumulates on the surface of the heat transfer fluid.

For accelerating the heating of the heat transfer fluid to the desired temperature and for speeding up the actual cleaning process, the vessel 1 is provided with a tubular pump compartment 5 extending at a suitable location between the external wall 1a and the internal wall 1b. The pump compartment 5 which is suitably also enclosed by the heat insulation 1c of the vessel 1 is in communication with the interior of the vessel 1 via an upper channel 6 and a lower channel 7 and thus is also filled with heat transfer fluid.

As shown in the FIGURE, the liquid level F of the heat transfer fluid should suitably be above the upper channel 6 so as to ensure circulation of the heat transfer fluid in direction of the arrows. Projecting into the pump compartment 5 is an impeller 8a which is part of a pump whose drive motor such as electromotor 8b is arranged outside the vessel 1 on the top surface thereof and is connected to the impeller 8a via a shaft 8c. The length of the shaft 8c is selected such that the impeller 8a is arranged at a suitable distance below the upper channel 6 to allow aspiration of heat transfer fluid through the upper channel 6 and delivery of heat transfer fluid through the lower channel 7.

Preferably, the heating elements 3 and the pump motor 8b are operated simultaneously by means of a suitable electric control (not shown). Thus, when switching on the heating elements 3, the impeller 8a of the pump imparts a motion to the heat transfer fluid which thus flows from the suction side as defined by the upper channel 6 to the delivery side as defined by the lower channel 7 in direction of the arrows to thereby attain an even and rapid heating of the heat transfer fluid without encountering local overheating, and in addition to circulate the heat transfer fluid about the parts which are to be cleaned and placed within the vessel 1. The circulation of the heat transfer fluid leads to a better cleaning effect even at relatively low flow rate when comparing to conventional cleaning apparatuses which use electromagnetic or pneumatic devices for oscillating the heat transfer fluid.

As is further shown in the FIGURE, the interior of the vessel 1 is provided with a helical cooling pipe 10 which is supplied with a cooling fluid such as water for cooling the heat transfer fluid after cleaning. Thus, not only the heating time but also the cooling time is considerably reduced when circulating the heat transfer fluid by activating the pump i.e. the pump motor 8b and the impeller 8a.

It will be appreciated that it is certainly within the scope of the invention to line the lid 2 also with a heat insulation. Further, although not shown in the drawing, the interior of the vessel 1 may be equipped with flashings, guide rails or the like for preventing the parts to be cleaned or the basket accommodating the parts from direct contact with the internal wall 1*b* or the cooling pipe 10 to avoid damages of these respective elements.

While the invention has been illustrated and described as embodied in an apparatus for removing residues from parts of plastics processing machines, it is not intended to be limited to the details shown since various modifications and structural changes may be made without departing in any way from the spirit of the present invention.

What is claimed as new and desired to be protected by Letters Patent is set forth in the appended claims:

I claim:

1. Apparatus for removing residues, especially plastic residues from parts of processing machines, comprising:
    a vessel receiving the parts and having a closable top and a bottom, said vessel defining an interior containing a heat transfer fluid at a predetermined liquid level;
    heating means for raising the temperature of said heat transfer fluid above a melting temperature of the plastic residues adhering to the parts;
    filter means connected with said interior of said vessel for absorbing substances escaping from said interior of said vessel;
    pump means for imparting a motion to said heat transfer fluid, said pump means having a suction side connected to said interior in vicinity of said liquid level and a delivery side connected to said interior in vicinity of said bottom of said vessel; and
    means for introducing an inert gas into said interior of said vessel above said liquid level of said heat transfer fluid.

2. Apparatus as defined in claim 1 wherein said inert gas introducing means includes a source of inert gas and a circular conduit connected to said source of inert gas, said circular conduit being arranged above said liquid level of said heat transfer fluid within said interior of said vessel and having a plurality of bores for connecting said circular conduit with said interior of said vessel.

3. Apparatus as defined in claim 2 wherein said inert gas introducing means further includes a valve for regulating the flow of inert gas from said source of inert gas via said circular conduit into said interior of said vessel.

4. Apparatus as defined in claim 2 wherein said vessel defines a center axis, said bores extending in direction toward said center axis of said vessel.

5. Apparatus as defined in claim 1 wherein said vessel defines a center axis and is provided with a tubular pump compartment in which said pump means is arranged, said pump compartment defining an axis which extends parallel to said center axis of said vessel and being connected with said interior via an upper channel and a lower channel.

6. Apparatus as defined in claim 5 wherein said pump means includes an impeller extending in said pump compartment.

7. Apparatus as defined in claim 5, and further comprising insulation means for insulating said vessel, said insulation means surrounding also said tubular pump compartment.

8. Apparatus as defined in claim 1 wherein said pump means includes a pump motor arranged outside said vessel.

9. Apparatus as defined in claim 1 wherein said filter means is an activated charcoal filter supported by said top of said vessel.

10. Apparatus as defined in claim 1 wherein said vessel is a double-walled vessel defining a center axis and having an internal wall and an external wall spaced from each other at a suitable distance, and further comprising insulation means arranged within said space between said internal wall and said external wall for insulating said interior of said vessel, said vessel being provided with a tubular pump compartment extending between said internal wall and said external wall and being surrounded by said insulation means, said pump compartment defining an axis which is oriented parallel to said center axis of said vessel and being connected with said interior via an upper channel and a lower channel, with each of said upper and lower channels extending through said internal wall.

11. Apparatus as defined in claim 10 wherein said heating means includes a heating element extending parallel to and in vicinity of said internal wall of said vessel.

* * * * *